(12) United States Patent
Buckwalter et al.

(10) Patent No.: US 8,332,303 B2
(45) Date of Patent: Dec. 11, 2012

(54) METHOD AND APPARATUS FOR MONITORING AND EVALUATING TRADE ACTIVITY

(75) Inventors: Alan Mark Buckwalter, Glen Rock, NJ (US); John Paul Xenakis, Red Bank, NJ (US)

(73) Assignee: Goldman, Sachs & Co., New York, NY (US)

( * ) Notice: Subject to any disclaimer, the term of this patent is extended or adjusted under 35 U.S.C. 154(b) by 986 days.

(21) Appl. No.: 10/246,562

(22) Filed: Sep. 18, 2002

(65) Prior Publication Data

US 2003/0177085 A1    Sep. 18, 2003

Related U.S. Application Data

(60) Provisional application No. 60/365,040, filed on Mar. 15, 2002.

(51) Int. Cl.
*G06Q 40/00* (2012.01)
(52) U.S. Cl. .................. 705/37; 705/35; 705/45
(58) Field of Classification Search ............ 705/35–45
See application file for complete search history.

(56) References Cited

U.S. PATENT DOCUMENTS

| | | | |
|---|---|---|---|
| 4,412,287 A | 10/1983 | Braddock, III | |
| 4,674,044 A | 6/1987 | Kalmus et al. | |
| 4,677,552 A | 6/1987 | Sibley, Jr. | |
| 4,823,265 A | 4/1989 | Nelson | |
| 5,168,446 A | 12/1992 | Wiseman | |
| 5,517,406 A | 5/1996 | Harris et al. | |
| 5,873,071 A | 2/1999 | Ferstenberg et al. | |
| 5,963,923 A | 10/1999 | Garber | |
| 6,016,483 A | 1/2000 | Rickard et al. | |
| 6,029,146 A | 2/2000 | Hawkins et al. | |
| 6,105,005 A | 8/2000 | Fuhrer | |
| 6,131,087 A | 10/2000 | Luke et al. | |
| 6,134,535 A | 10/2000 | Belzberg | |
| 6,195,647 B1 | 2/2001 | Martyn et al. | |
| 6,247,000 B1 | 6/2001 | Hawkins et al. | |
| 6,278,982 B1 | 8/2001 | Korhammer et al. | |
| 6,317,728 B1 | 11/2001 | Kane | |
| 6,347,307 B1 | 2/2002 | Sandhu et al. | |
| 6,829,589 B1 * | 12/2004 | Saliba | 705/36 R |
| 2001/0042040 A1 | 11/2001 | Keith | |
| 2001/0044767 A1 * | 11/2001 | Madoff et al. | 705/37 |
| 2001/0044770 A1 | 11/2001 | Keith | |

(Continued)

OTHER PUBLICATIONS www.sec.gov website, Trade Execution: What Every Investor Should Know.*

(Continued)

*Primary Examiner* — Hai Tran
(74) *Attorney, Agent, or Firm* — Perkins Coie LLP

(57) ABSTRACT

Systems, methods, apparatus, computer program code and means for generating quality data associated with an option order are provided. In some embodiments, an option order is received, the option order including information identifying a customer, and information identifying a desired option. The option order is associated with an order time. First national best bid and offer (NBBO) data are identified for the desired option at the order time. Execution information associated with the option order are identified, where the execution information includes information identifying a price, an exchange, and an execution time. Second NBBO data for the desired option at the execution time is identified, and the execution information is compared with at least one of the first and second NBBO data.

13 Claims, 6 Drawing Sheets

U.S. PATENT DOCUMENTS

| | | | |
|---|---|---|---|
| 2001/0051909 | A1 | 12/2001 | Keith |
| 2002/0156719 | A1* | 10/2002 | Finebaum et al. ............... 705/37 |
| 2002/0194115 | A1* | 12/2002 | Nordlicht et al. ............... 705/37 |
| 2003/0130926 | A1* | 7/2003 | Moore et al. .................... 705/37 |

OTHER PUBLICATIONS

Peter Chapman. (Mar. 2000). Quality Control at Mother Merrill: Spending Big Bucks to Obtain Best Execution. Traders Magazine,1. Retrieved Oct. 8, 2010, from Banking Information Source. (Document ID: 50963688).*

Editorial Staff. "Trade Monitoring Professionals." Traders Magazine Aug. 1, 2001: Banking Information Source, ProQuest. Web. May 25, 2011.*

"The Striking Price: Pay for Play", (Options Orders: Are you getting the best price?) by Erin E Arvedlund, Barron's New York, N.Y.: May 15, 2000, vol. 80, iss. 20; p. MW10, 1pgs. (ProQuest Web).*

"Investor Tips: Trade Execution", U.S. Securities and Exchange Commission, downloaded from http://www.sec.gov/investor/pubs/tradexec.html on Sep. 25, 2003. 4pgs.

Rini, Bill et al "Subject: Trade—Order Routing and Payment for Order Flow", The Investment FAQ, Last-Revised Nov. 25, 1999, download from http://invest-faq.com/articles/trade-order-routing.html on Sep. 25, 2003. 5pgs.

Louis, Brian "Options Linkage Plan Won't Provide Instant Solution", TheStreet.com, Jul. 28, 2000, downloaded from http://www.thestreet.com/pf/stocks/brokerages/1019385.html on Sep. 25, 2003. 2pgs.

"SRO Rulemaking, Supplementary Material: Chicago Board Options Exchange Options Linkage Plan", U.S. Securities and Exchange Commission, Jan. 19, 2000 downloaded from http://www.sec.gov/rules/extra/cboe.htm on Sep. 25, 2003. 29pgs.

* cited by examiner

File   Edit   View   Tools   Help

[New Records ▼] [Cust. C1001 ▼]   [SUBSCRIPTION]   ←702

| Ex Time | Contracts | Symbol | Side | Root | Type | Ex Month | Strike | Ex Price | Ex. Exch | Best Price | Best Exch | $$ Value | Fast Mkt | Alert Reas | Ord Time | Order Price | Old Contracts |
|---------|-----------|--------|------|------|------|----------|--------|----------|----------|------------|-----------|----------|----------|------------|----------|-------------|---------------|
| 93031a  | 10 | QQQ | Buy  | QQQ DI  | Call | Apr | 35 | 0.85 | ISE | 0.80 | PCX | 50.00 | | Ex alert | 12:00a | | |
| 93031a  | 5  | QQQ | Sell | QAV DH  | Call | Apr | 34 | 1.30 | ISE | 1.35 | ISE | 25.00 | | Ex alert | 0101a | | |
| 93038a  | 30 | QQQ | Buy  | QAV DF  | Call | Apr | 32 | 3.00 | ISE | 2.95 | AMEX | 150.00 | | Ex alert | 0700a | | |
| 93049a  | 10 | QQQ | Buy  | QQQ EK  | Call | May | 37 | 0.75 | ISE | 0.70 | PCX, CBOE | 50.00 | | Ex alert | 0715a | | |
| 9356223a| 10 | QQQ | Buy  | QQQ PI  | Put  | Apr | 35 | 1.10 | ISE | 1.05 | CBOE | 50.00 | | Ex alert | 0800a | | |
| 101550a | 2  | QQQ | Sell | VZQ AX  | Call | Jan | 50 | 0.35 | ISE | 0.40 | PCX | 10.00 | | Ex alert | 0930a | | |

704

Action   Reason(s)

Matched NBBO    ☐ Bettered NBBO    ☐ Late Print
                ☐ Trade Processed  ☐ Opening
Price not       ☐ Fir Brok Discretion ☐ Price Improvement
Corrected       ☐ B/D              ☐ Other
                ☐ Fast Mkt
                ☐ Cross/locked Ex Firm    Contra Firm(s)                    Detail

[Branch / #]                                 [Submit]

FIG. 5A

METHOD AND APPARATUS FOR MONITORING AND EVALUATING TRADE ACTIVITY

RELATED APPLICATIONS

This application is based on, and claims priority to, U.S. Provisional Application Ser. No. 60/365,040, filed Mar. 15, 2002, for "Method and Apparatus for Processing and Routing Transactions." This application is related to and commonly-assigned U.S. patent application Ser. No. 10/246,561, filed Sep. 18, 2002 for "Method and Apparatus for Processing and Routing Transactions", now U.S. Pat. No. 8,140,420. The contents of each application are incorporated by reference herein in their entirety.

FIELD

The present invention relates to the monitoring and evaluation of transactions. More particularly, embodiments of the present invention relate to systems, methods, apparatus, computer program code and means to monitor and evaluate options trades.

BACKGROUND

In the United States, exchange-trading of options has existed in a standardized, regulated marketplace since the 1970's. An option is essentially a contract giving a buyer the right, but not the obligation, to buy or sell shares of an underlying security at a specific price for a specific time. Since the 1970's a number of exchanges have been formed, including the Chicago Board Options Exchange (the "CBOE"), the American Stock Exchange (the "AMEX"), the Pacific Stock Exchange (the "PCSE"), the International Securities Exchange (the "ISE"), and the Philadelphia Stock Exchange (the "PHLX"). In general terms, four specifications describe an options contract: the type of the option (e.g., a put or a call), the premium (or the initial amount paid on the contract), the underlying security (or the security, such as an equity, which must be delivered or purchased if the option is exercised), and a contract expiration date.

Unlike other exchange-traded securities, which can generally be traded on equal terms at any exchange, many options trade differently at different exchanges. The variations can include differences in price, execution time, liquidity, etc. For example, an option whose underlying security is IBM, Corp. stock may be traded on several exchanges, however, there may be slightly different order pricing and execution characteristics associated with trades at different exchanges. IBM options at the ISE, for example, may be trading at the National Best Bid and Offer ("NBBO"—a dynamically updated price which shows a security's highest bid and lowest offer among all exchanges and market makers registered to trade in that security), while IBM options at the AMEX may be slightly higher than the NBBO.

In the future, it is possible that each of the different exchanges will enter into linkage agreements; however, until then this fragmented market continues to make it difficult for options customers to obtain best execution of their orders. The fragmented market also makes it difficult for customers to assess the overall quality of execution of their orders. The Securities and Exchange Commission (SEC) imposes a general duty on brokers to their customers to provide a duty of "best execution". While the SEC does not explicitly define best execution, for a particular options trade the duty generally requires that the trade be executed on the most favorable terms available for the trade among all of the options exchanges at the time of the trade. It would be desirable to provide a system to monitor and evaluate option trade activity which overcomes deficiencies associated with existing trading systems.

SUMMARY

To alleviate problems inherent in the prior art, embodiments of the present invention introduce systems, methods, apparatus, computer program code and means for generating quality data associated with an option order are provided. In some embodiments, an option order is received, the option order including information identifying a customer, and information identifying a desired option. The option order is associated with an order time. First national best bid and offer (NBBO) data are identified for the desired option at the order time. Execution information associated with the option order are identified, where the execution information includes information identifying a price, an exchange, and an execution time. Second NBBO data for the desired option at the execution time is identified, and the execution information is compared with at least one of the first and second NBBO data.

In some embodiments, the option order is forwarded to a selected one of a plurality of option exchanges to complete the order. The forwarding may be based on one of the information identifying the customer or the information identifying the desired option.

In some embodiments, the NBBO data is generated based on a plurality of best bid and offer (BBO) data from a plurality of option exchanges. With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIGS. 5A and 5B are illustrative user interfaces which may be displayed on an operator device of the system of FIG. 1.

DETAILED DESCRIPTION

Figure 1:
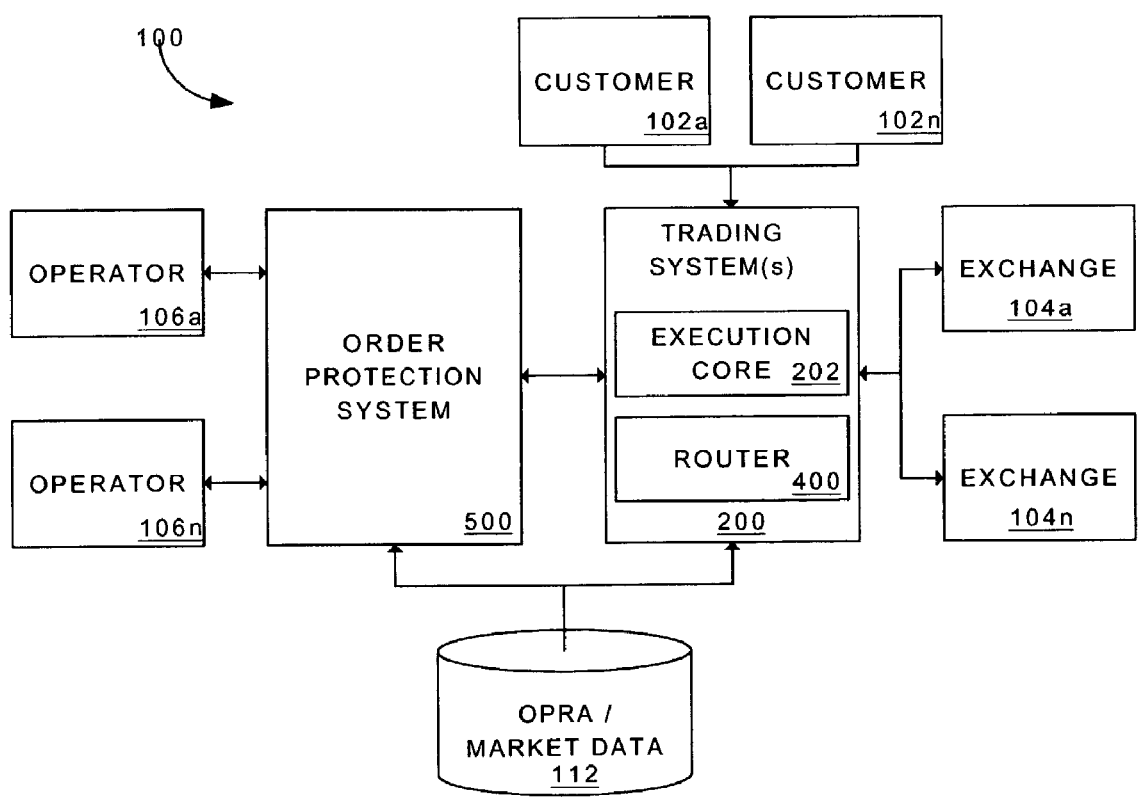
FIG. 1 is a block diagram of a system consistent with the present invention.

Applicants have recognized that there is a need for a system, method, apparatus, computer program code, and means to monitor and evaluate options trade activity.

For the purposes of describing features of embodiments of the present invention, a number of terms are used herein. For example, the term "option" is used herein to refer to a contract which gives a buyer the right, but not the obligation, to buy or sell shares of the underlying security or index at a specific price for a specified time. In the description presented herein, the underlying securities described are equity securities or "stocks". Stock option contracts generally are for 100 shares of the underlying stock.

As used herein, the term "option order" is used to refer to orders involving offers to purchase or sell securities commonly known as "options". As used herein, each option order includes a number of terms defining the offer to purchase or sell. For example, an option order may include a customer identifier (identifying the party offering to purchase or sell), a symbol (identifying the underlying security associated with the option order, referred to as the "underlyer"), an amount or size of the order (identifying the number, typically in lots of 100, of options desired to be purchased or sold). Each option order may also include information identifying a type of the order. For example, the option order may be immediately executable (e.g., be a market or marketable limit order), or it may have special conditions or instructions associated with the order. Finally, each order may also include information identifying an expiration date of the option contract.

As used herein, the terms "exchange" or "options exchange" are used to refer to any securities exchange which lists and facilitates the trading of options. For example, currently in the U.S., listed options are traded on the following national securities exchanges: the CBOE (exchange symbol "W"), the AMEX (exchange symbol "A"), the PCSE (exchange symbol "P"), the ISE (exchange symbol "I") and the PHLX (exchange symbol "X"). Embodiments of the present invention may be used to route and facilitate trading of options on other exchanges as well (including non-U.S. exchanges), and the terms "exchange" or "options exchange" are not intended to be limited to the above-identified exchanges.

As used herein, the term "specialist" includes registered competitive market makers, specialists, primary market makers and other registered securities dealers which maintain firm bids and offers by standing ready to buy or sell contracts of securities and which announce their pricing throughout the day.

As used herein, the term "trade through" refers to an option order which is executed at a price worse than the best published quote at the time of execution. As used herein, the term "price improvement" generally means modification of an order price (in a positive direction). For example, a customer who places an option order expecting to pay $5.00 for a particular option contract receives a "price improvement" if the order is executed at $4.95.

In general, and for the purposes of introducing concepts of embodiments of the present invention, option trade activity is monitored and evaluated pursuant to embodiments of the present invention as follows. A customer submits an option order to a broker, requesting execution of the option order. A trading system, upon receipt of the order, timestamps the order and captures the terms of the order (e.g., including information identifying the customer, the requested product, price, quantity, and any restrictions associated with the order). At the time of receiving the order, a snapshot of the market is captured to identify the NBBO at the time of the order. The NBBO at the time of the order is, in some embodiments, an NBBO that is synthesized from BBO data from each exchange. In some embodiments, this information is stored at a database accessible to a customer order protection system server or other device operated to store, monitor and analyze customer orders.

When a trading system receives data regarding the execution of the order, further information is captured, including, for example: a timestamp of the execution, and a snapshot of the market to identify the NBBO at the time of the execution (e.g., by synthesizing BBO data from each of the exchanges). In some embodiments, the monitoring and evaluation of option trade activity is further enhanced through the use of a routing system such as the system described in copending, commonly-assigned U.S. patent application Ser. No. 10/246,561 filed on Sep. 18, 2002 for "Method and Apparatus for Processing and Routing Transactions", now U.S. Pat. No. 8,140,420, the contents of which are incorporated herein by reference for all purposes.

Quality data or information is then generated by comparing the market data at the time the order was received and the market data at the time of execution to identify any discrepancies or information affecting execution quality. In some embodiments, if it appears that the customer did not receive best execution on the order, corrective steps may be taken to provide the customer with best execution. In some embodiments, a number of execution quality and analysis reports may be generated based on the stored information, allowing the broker and the broker's customers to monitor and summarize order activity and quality.

In some embodiments, evaluation of quality data may include classifying limit orders to determine if an unexecuted limit order was marketable. A "limit order" is an option order which specifies a request to buy or sell an option at a specific price or better. Pursuant to some embodiments, the system of the present invention is configured to provide limit order protection to identify or flag open, un-executed customer limit orders. Other features and advantages will be apparent to those skilled in the art.

Embodiments of the present invention will now be described by first referring to FIG. 1 where a block diagram of one embodiment of a trading network 100 is shown. As shown, trading network 100 includes a number of different components which cooperatively operate to process, route and execute option orders pursuant to some embodiments of the present invention. The components further cooperatively operate to allow the monitoring and analysis of the execution of option orders.

As depicted, trading network 100 includes an order protection system 500 in communication with a trading system 200, a source of market data 112, and one or more operator devices 106. Trading system 200 is in communication with one or more customer(s) 102, one or more exchange(s) 104 and source of market data 112. Trading system 200, in some embodiments, includes an execution core 202 and a router 400. Execution core 202 may be any trade execution software, systems and/or devices which are configured to receive customer orders and process them to execute orders on behalf of customers. For example, execution core 202 may be the REDI® product offered by Spear, Leeds & Kellogg (a division of Goldman Sachs & Co.) and which provides integration of option quotes with rapid order entry and position management. Other suitable execution cores may also be used. In some embodiments, execution core 202 functions to timestamp orders when received and to assign an order identifier or sequence number to each order. This sequence number, as will be described further below, is used to associate order information with execution information. In some embodiments, execution core 202 may also function to receive execution data once a trade is completed.

In some embodiments, a router 400 is provided as part of trading system 200. Router 400 is configured to receive option orders from trading system 200 and route them to an appropriate options exchange for execution. For example, router 400 may be configured to apply one or more routing rules to each option order to route each order in an desired manner.

Although a single order protection system 500 and a single trading system 200 are shown in FIG. 1, any number of these devices may be included in trading network 100. For example, in one embodiment, a number of different trading systems 200 are in communication with order protection system 500 to allow multiple trading systems to monitor and analyze order execution information pursuant to embodiments of the present invention. Similarly, any number of market data sources 112, customer devices 102, exchange devices 104 or any other device described herein may be included in the trading network 100 according to embodiments of the present invention. In some embodiments, order protection system 500 is utilized in conjunction with trading systems 200 which do not utilize a router 400.

Each of the devices of network 100 may be formed of components or other devices capable of performing the various functions described herein. For example, a customer device 102 may be a computing device such as a Personal Computer (PC), a laptop, a telephone, or other device associated with a customer. As used herein, the term "customer" may refer to, for example, an individual or other entity that buys and sells securities (and, pursuant to some embodiments of the present invention, options). For example, a customer operating a customer device may be a broker or other entity desiring to purchase or sell options using features of embodiments of the present invention. The broker or other entity may be operating on behalf of the ultimate purchaser of the securities.

An exchange device 104 may be any computing device(s) operated by or on behalf of one or more securities exchanges. In one particular embodiment, exchange devices 104 are devices or systems operated by or on behalf of exchanges which facilitate the trade of options. For the purposes of describing features of embodiments of the present invention, the five U.S. exchanges identified above will be referenced herein. Each of these exchanges may be in communication with other devices described herein using techniques known in the art. For example, the five U.S. exchanges are in communication with a central entity (the Options Clearing Corporation, or "OCC") which acts as a central clearing organization to process option contract trades. In general, the OCC receives information from the exchanges after the completion of trades, and operates to ensure trades are completed and settled pursuant to their terms.

Exchange device 104 may include one or more operator terminals allowing specialists or traders at the exchange to respond to option orders received and to complete an option order pursuant to its terms.

Market data 112 may be any of a number of different types of options market data received from a variety of data sources and which can be used to facilitate option transactions. For example, in the U.S., intra-day option pricing data is provided by the Option Price Reporting Authority (OPRA). In some embodiments, market data 112 includes a feed of OPRA data. In some embodiments, this OPRA data feed is received by order protection system 500 and/or trading system(s) 200 substantially in real-time. This OPRA data feed provides option pricing from each of the options exchanges in the U.S. Those skilled in the art will recognize that other types of market data sources may also be used to assist in the processing and routing of transactions as described herein. For example, daily or monthly transaction volume information may be retrieved from the OCC or other sources and used to support routing decisions. As another example, daily pricing data may be retrieved from different specialists or traders. Market data 112 may be received by order protection system 500 and/or trading system(s) 200 on a regular basis or substantially in real-time.

Order protection system 500 may be any computing device which is capable of performing the various functions described herein. For example, in some embodiments, order protection system 500 may be configured as a Web server adapted to exchange information with operators 106, trading system(s) 200, and sources of market data 112. In some embodiments, order protection system 500 is a back office system operated by (or on behalf of) the same entity which operates trading system(s) 200, allowing the entity to amass, monitor, and evaluate options order execution data for trade requests received from its customers. In some embodiments, order protection system 500 is operated by (or on behalf of) one entity while trading system(s) 200 are operated by (or on behalf of) other entities. For example, a service provider may operate order protection system 500 as a fee-based service, allowing a number of different brokers to interact with the system and to utilize features of the order protection system.

As used herein, devices (e.g., order protection system 500, operator devices 106, exchanges 104, customer devices 102 and market data sources 112) may communicate, for example, via one or more communication networks. For example, some or all of the devices may be in communication via an Internet Protocol (IP) network such as the Internet. Some or all of the devices may be in communication via other types of networks such as an intranet, a Local Area Network (LAN), a Metropolitan Area Network (MAN), a Wide Area Network (WAN), a proprietary network, a Public Switched Telephone Network (PSTN), and/or a wireless network.

According to some embodiments of the present invention, communication between some or all of the devices of network 100 may be via a temporary computer communication channel (e.g., a logic path through which information can be exchanged). In other words, the communication channel between various devices may be established and discontinued as appropriate. For example, trading system 200 may exchange information with order protection system 500 only when communication is necessary to transmit order or execution data to order protection system 500.

According to some embodiments, some or all of the devices communicate with other devices via a public computer communication network. That is, at least a portion of the communication network may be accessed by devices other than the other devices depicted in FIG. 1. Note, however, that the information exchanged between order protection system 500 and other devices of FIG. 1 may be encrypted or otherwise protected to prevent a third party from accessing, manipulating, understanding and/or misusing the information. In some embodiments, some or all of the devices may communicate over a private network.

Figure 2:
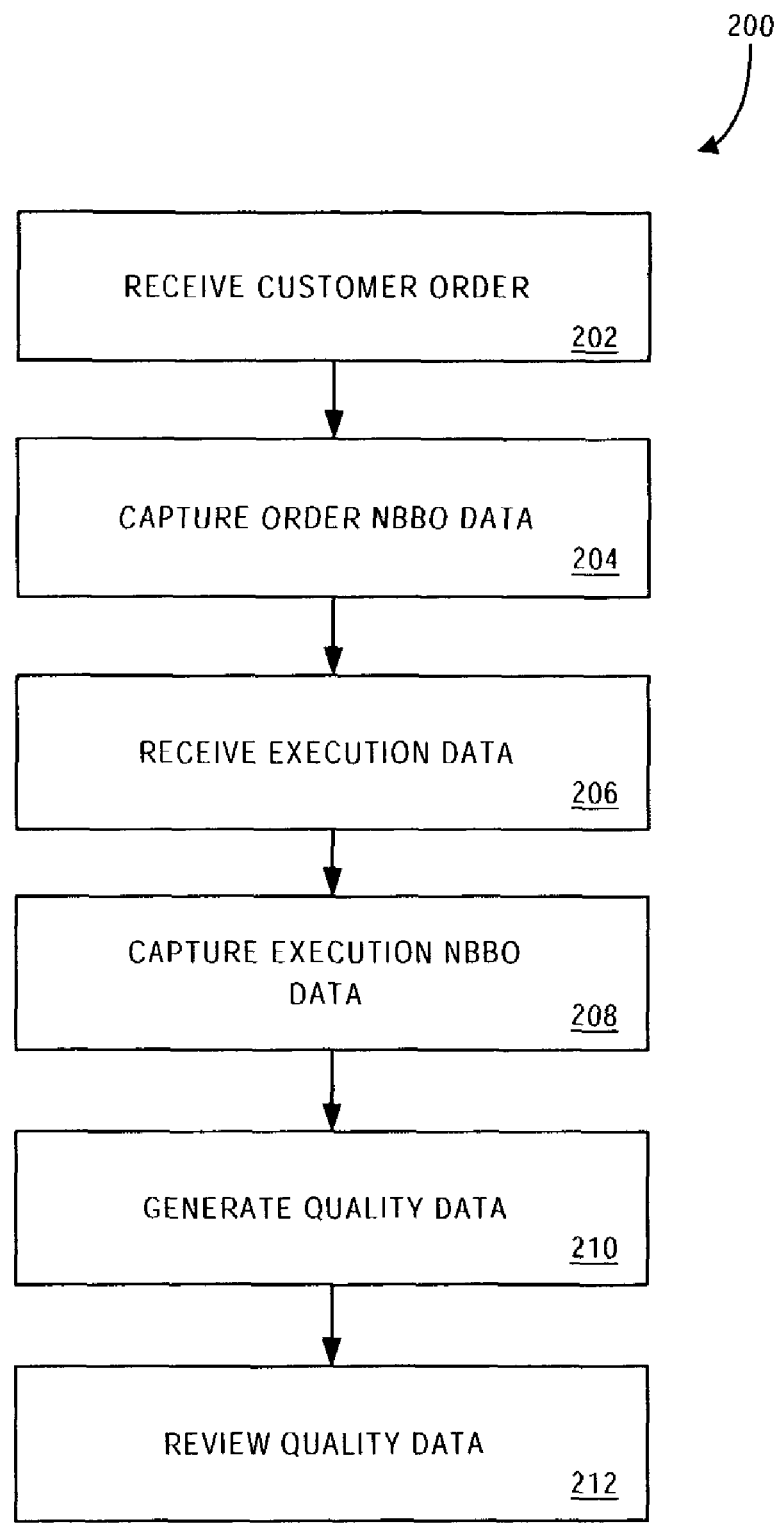
FIG. 2 is a flow diagram illustrating an exemplary process for monitoring and evaluating trade activity pursuant to one embodiment of the present invention.

Further details of some embodiments of order protection system 500 will be discussed further below in conjunction with FIGS. 3 and 4. First, however, reference is made to FIG. 2 where a process 200 is shown for monitoring and evaluating option trade activity is depicted. The flow chart in FIG. 2 and the flow charts in other figures described herein do not imply a fixed order to the steps, and embodiments of the present invention can be practiced in any order that is practicable. Some or all of the steps of the process shown in FIG. 2 may be performed, for example, by, or on behalf of, a trading entity or service provider operating order protection system 500 in conjunction with other devices (e.g., such as trading system 200).

Process 200 begins at 202 where a customer order is received. In some embodiments, this customer order is received from trading system 200 after it has been submitted to trading system 200 by a customer. The customer order may include details specifying the terms on which the customer wishes the order to be completed. For example, a typical option order will include information specifying the customer submitting the order, the product to be traded (e.g., a put or a call of a particular security underlyer having a particular expiration and strike price), the quantity of contracts to be traded and any restrictions on the order (e.g., good for the day, etc.). Some orders include information specifying a price (e.g., such as a limit order), while others specify that the trade be performed at the market price. In some embodiments, the information specifying the customer will include a customer name, account number, and branch identifier (if any). In some embodiments, an order identifier or sequence number is assigned to the customer order to uniquely identify the order. In some embodiments, the customer order is timestamped when it is received by trading system 200.

In some embodiments, processing at 202 may include determining if the received order is a limit order (e.g., a customer request to purchase a product at a desired price other than the market price).

At 204, NBBO information for the product at the time of the receipt of the order is captured. This NBBO information may be retrieved, for example, from a market data source 112 such as an OPRA data feed. The NBBO associated with a particular product at the time of receipt of an order associated with the product will be referred to herein as the "order NBBO". The order NBBO data may include information specifying the NBBO for the product at the order time at each of the exchanges (e.g., the NBBO is synthesized from BBO data from each of the exchanges). This order NBBO data is stored or otherwise associated with the customer order information.

If the customer order is a limit order, processing at 204 may include classifying the limit order by comparing the limit price to NBBO information. For example, in one embodiment, processing at 204 may include classifying limit orders into one of four categories. "Type 1" orders are orders that better the order NBBO. "Type 2" orders are orders that are equal to the order NBBO and better the BBO at the exchange to which they are directed. "Type 3" orders are orders that are within an enhanced NBBO (between the worst bid/offer). "Type 4" orders are all other orders. These classifications may be used to generate quality data and reports as described further below.

Processing continues at 206 where execution data is received. For example, execution data may be received from trading system 200 once the customer order has been executed or otherwise completed. Trading system 200, in some embodiments, timestamps the time of execution. The execution data and timestamp information received at 206 is matched to order information using, for example, the order identifier or sequence number. The execution data and timestamp information is stored or otherwise associated with the order information.

Processing continues at 208 where execution time NBBO data is captured. For example, this NBBO information may be retrieved from market data source 112 such as the OPRA data feed. As used herein, this NBBO data associated with a particular product at the time of execution of a customer order involving the product will be referred to as "execution NBBO data" (and may be synthesized from BBO data from each of the exchanges). The execution NBBO data associated with the product traded is captured and stored or otherwise associated with the order information, the order NBBO data, and the execution data. For example, this information may be stored at, or otherwise accessible to, order protection system 500. In some embodiments, execution NBBO data may also include data relating to market conditions or exchange-specific information such as whether the markets at the time of execution were fast, whether the execution was a book order, auto eligible, late, or the like. Market size at the time may also be provided.

Processing may continue at 210 where quality data is generated regarding the customer order. Quality data may be generated, for example, by comparing various data stored and associated with each customer order. For example, the order NBBO and the execution NBBO associated with a particular order may be compared to determine if the customer received best execution. A comparison may result in flagging certain customer orders to identify anomalous trades or trades requiring further scrutiny. An order which executed outside of both the order NBBO and the execution NBBO may be flagged. An order which executed outside of the order NBBO but within the execution NBBO may be flagged if the difference between the order and execution times is less than one minute (or some other specified time). An order which executed within the order NBBO, but outside of the execution NBBO may be flagged for further scrutiny (e.g., to ascertain whether the execution report was late or improperly timestamped). An order which otherwise has some discrepancy between the order NBBO and the exchange NBBO (and/or other exchange quotes) may also be flagged. This information may, for example, be stored in (or accessible to) quality database 600 associated with order protection system 500.

In some situations, one or more customer orders will not execute. For example, customer orders which are limit orders may not execute for various reasons. Quality data generated at 210 may also include identifying limit orders which have not executed. In some embodiments, the generation of quality data or monitoring of unexecuted limit orders does not commence until after some pre-established waiting period. For example, in one embodiment, unexecuted limit orders are monitored if the limit order remains unexecuted ninety (90) seconds after a trade occurs at or through the limit price for the product. Monitoring at 210 may include reviewing real-time market data in an attempt to identify some way to achieve full or partial execution of the unexecuted limit orders. This reviewing may be performed, for example, via the operator devices 106a-n (e.g., using user interfaces such as the user interfaces described below in conjunction with FIG. 5).

Processing continues at 212 where quality data generated at 210 is reviewed. This review may be automated using a rule-based or other system, or it may be performed by one or more operators interacting with the data using operator devices 106. In some embodiments, only flagged information is reviewed. In some embodiments, one or more order reports may be generated using any of a number of different data combinations (e.g., reports may be generated by exchange, by customer, by symbol, by back order flow statistics, etc.)

In some embodiments, review at 212 may include performing full or partial trade through or trade at of unexecuted limit orders. For example, unexecuted limit orders which have been identified at 210 above may be perform trade through based on customer-specified rules. For example, one customer may specify that all unexecuted limit orders classified as "Type 1" be traded through (e.g., sent away from the broker operating trading system 200 to another broker who can achieve execution at or near the limit price) in sizes of less than or equal to 50 contracts. The customer may further specify that all unexecuted limit orders classified as "Type 2" be traded through in sizes of less than or equal to 20 contracts. The customer may specify additional trade through rules for unexecuted limit orders classified as "Type 3" or "Type 4". In this manner, customer may establish the minimum quantity expected to be satisfied given the market conditions. In the context of limit orders, for example, a trade through occurs when one exchange trades at a price better than the limit price of an order that was sent to a different exchange, and remains un-executed. Similar processing may be performed for "trade at" trades (e.g., trades where an order was traded at by a particular exchange).

For limit orders which are monitored and analyzed pursuant to embodiments of the present invention, and which are eventually completed, data may be stored indicating the size and cumulative percentage of orders satisfied (e.g., from trade thoughs or trade ats). For example, data may be stored (and reports generated) indicating: the customer identifier, the date, the details of the order, the type of order (e.g., Types 1-4 or the like), the size of the order, the trade through size, the eligible size, the satisfied size, the cumulative percentage satisfied, and comments (e.g., such as comments directed to the overall quality and nature of execution—"GOOD", "GREAT", "BETTER", "PERFECT", "ERROR", "FAST MARKET", "SPREAD", etc.). Those skilled in the art will recognize that other actions, reports, and steps may be made when analyzing quality data captured and maintained using embodiments of the present invention.

Figure 3:
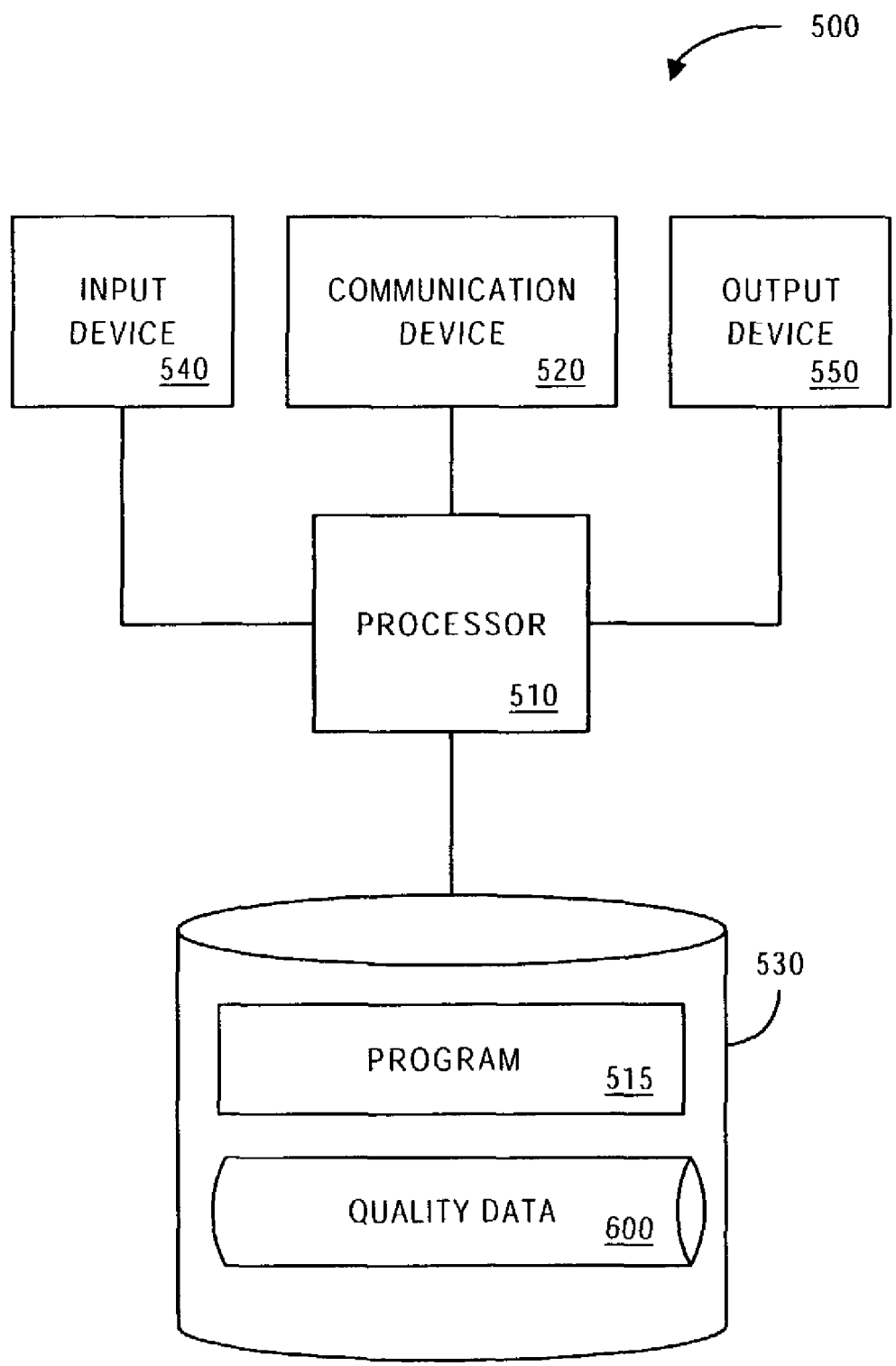
FIG. 3 is a block diagram of one embodiment of a order protection system for use in conjunction with the system of FIG. 1.

Reference is now made to FIG. 3 where an embodiment of order protection system 500 is shown. As depicted, order protection system 500 includes a computer processor operatively coupled to a communication device 520, a storage device 530, an input device 540 and an output device 550. Communication device 520 may be used to facilitate communication with, for example, other devices (such as user devices 102, exchanges 104, trading system 200 and sources of market data 112). Input device 540 may comprise, for example, a keyboard, a keypad, a mouse or other pointing device, a microphone, knob or a switch, an infra-red (IR) port, a docking station, and/or a touch screen. Input device 540 may be used, for example, to enter information (e.g., information regarding routing rules or the like). Output device 550 may comprise, for example, a display (e.g., a display screen), a speaker, and/or a printer.

Storage device 530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 530 stores one or more programs 515 for controlling processor 510. Processor 510 performs instructions of program 515, and thereby operates in accordance with the present invention. In some embodiments, program 515 may be a rule-based engine which applies routing rules to customer orders. In some embodiments, program 515 may be configured as a neural-network or other type of program using techniques known to those skilled in the art to achieve the functionality described herein. In some embodiments, program 515 may provide the functionality of each of the major components of trading system 200, including execution core 202 and router 400.

Storage device 530 also stores databases, including, for example, a quality database 600. Other databases may also be provided (e.g., if the same device provides the functionality of the router and the execution core, order and execution data may also be stored in storage device 530 as well). An example of a quality database 600 is described below in conjunction with FIG. 4, and example quality data is described below in conjunction with a description of various quality data generation and monitoring features. Those skilled in the art, upon reading this disclosure, will understand that a number of different quality data and reports may be utilized.

Figure 4:
FIG. 4 is a table illustrating an exemplary data structure of a trade quality database for use in the present invention.

Referring now to FIG. 4, a table represents a quality database 600 that may be stored at (or accessible by) order protection system 500. This database is described in detail below and depicted with exemplary entries in the accompanying figure. As will be understood by those skilled in the art, the schematic illustrations and accompanying descriptions of the databases presented herein are exemplary arrangements for stored representations of information. A number of other arrangements may be employed besides those suggested by the table shown. Similarly, the illustrated entries of the database represent exemplary information only. Those skilled in the art will understand that the number and content of the entries can be different from those illustrated herein. Other example data and combinations of data are depicted in the user interfaces described below in conjunction with FIGS. 5A and 5B.

Quality database 600 (as depicted) includes entries identifying a number of pieces of information regarding customer orders which were received by trading system 200. This quality data may be generated on a substantially real-time basis throughout the trading day to ensure that brokers and their customers are aware of the general quality of trading and to allow brokers to take corrective action on behalf of their customers. In some embodiments, the type of data stored in quality database may be varied based on customer-specified rules. In some embodiments, the type of data stored in quality database is generally fixed by the entity operating order protection system 500.

As depicted, the table defines a number of fields 602-620 for each of the entries. The fields specify: an order identifier 602, a time order received 604, order terms 606, customer information 608, market data at order time 610, time execution received 612, execution terms 614, market data at execution 616, flags 618 and comments 620. The data populating database 600 is stored and captured at several different times. For example, the order identifier 602, time order received 604, order terms 606, customer information 606, and market data at order time 608 are captured and stored at or near the time the order is received. The remaining fields may be captured and stored, for example, at the time an execution is received.

Order identifier 602 (otherwise referred to as a sequence number) may be alphanumeric data uniquely identifying a particular order received by trading system 200. This identifier may be, for example, generated by execution core 202 when the order is received. Time order received 604 may be alphanumeric data identifying the time and date at which the order identified by order identifier 602 is received. Time order received 604 may be generated by the execution core 202 when the order is received. Order terms 606 include data specifically identifying the terms of a particular customer order, including the type of order, the size, the underlyer, the expiration date, a price (if a limit order), and an exchange (if the customer specifies a particular exchange).

Customer information 608 includes data identifying a particular customer for which quality data is maintained and evaluated using embodiments of the present invention. The data may be alphanumeric data used to uniquely identify a particular customer. Market data at order time 610 includes data retrieved from market data source 112 identifying the NBBO and other market data associated with the particular underlyer and product identified in the customer order. For example, market data at order time 610 may include an NBBO and the exchange(s) at NBBO. Market data may also include the current pricing at each of the exchanges.

Time execution received 612 includes data identifying the time an execution is received for the customer order identified by order identifier 602. Again, this time information may be captured by execution core 202 when an execution is received. Execution terms 614 includes information identifying the terms on which the order executed (e.g., including the price, size, and exchange). Market data at execution time 616 includes information captured at or near the time of execution from market data source 112 and may include NBBO data at or near the time of execution (e.g., from BBO data from each of the exchanges). Flags 618 includes data identifying any anomalous market conditions or other information regarding the execution. For example, flags 618 may include data specifying that the market conditions at execution included: a fast market; a late print; a stale quote; cross/locked; floor broker discretion; BD trades; bettered NBBO; trade in processing, etc. Further comments, inserted by an operator or broker, may be associated with particular orders at 620. Other data may also be captured and analyzed as well.

Example user interface screens will now be described by reference to FIG. 5. The user interface screens of FIG. 5 may be displayed, for example, on display devices associated with operator devices 106, allowing system operators to interact with, review, and monitor option trade data captured using embodiments of the present invention. Operators may take remedial action based on the data and may also enter further data clarifying or commenting on transactions.

Referring first to FIG. 5A, a user interface 700 is shown which depicts a display of new records which are being evaluated by an operator. The new records are associated with a particular customer (customer identifier C1001). Each of the records are associated with a particular order which has been executed. Details of the order and the execution are provided at 702. A total dollar value of any price difference between the execution and the NBBO is also shown, allowing an operator to quickly assess whether to adjust the trade.

An action area is provided at 704 where an operator may take action (e.g., such as matching the trade at the NBBO or indicating that the price is not corrected). This action area is applied by an operator against each trade to resolve differences between the NBBO and the execution. Reasons may be checked by the operator (e.g., in support of not correcting a price, etc.). In some embodiments, an operator monitors and resolves each transaction using a display similar to the display of FIG. 5.

Figure 5B:
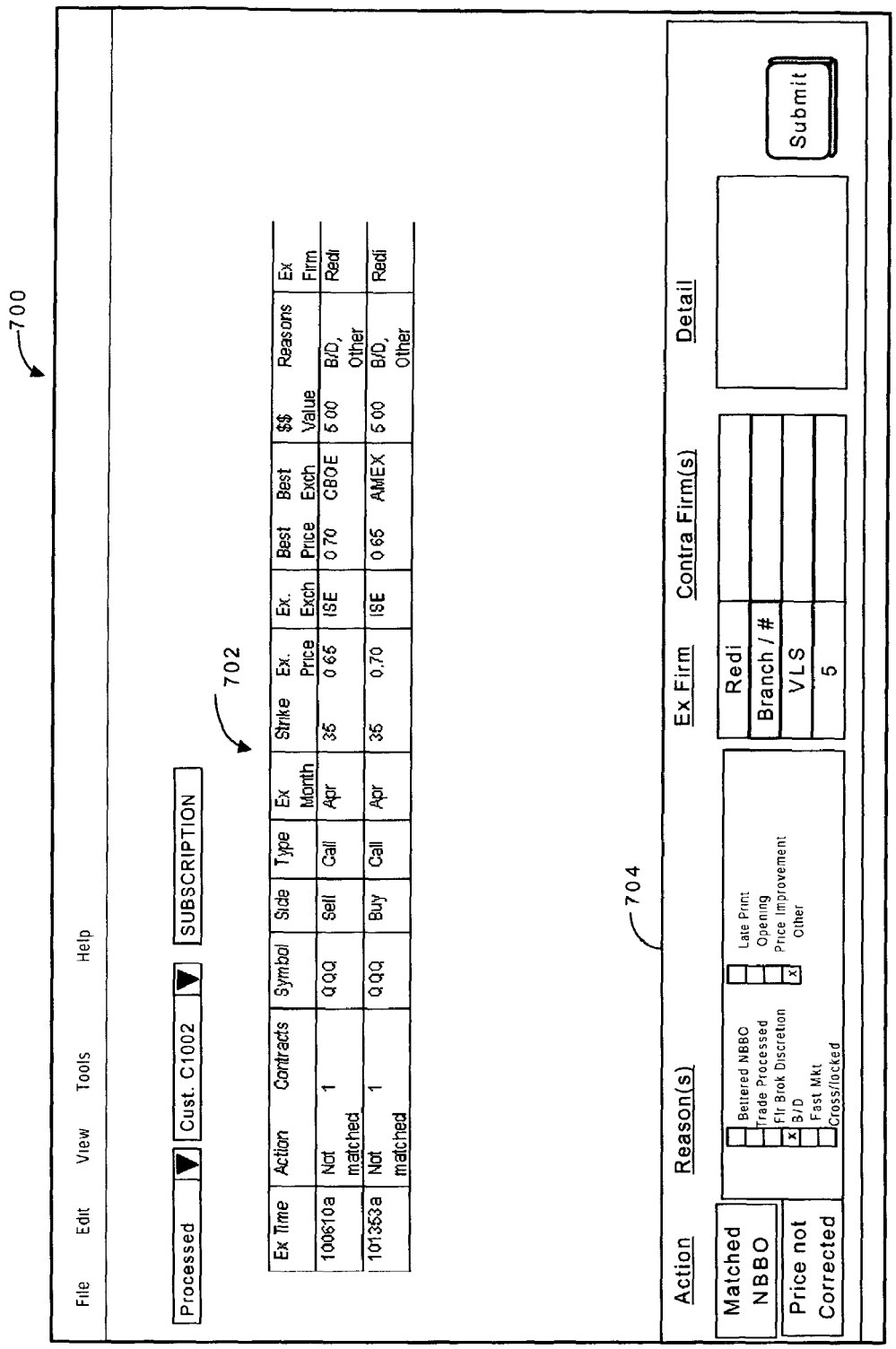

Referring to FIG. 5B, a further user interface 700 is depicted which may be presented to an operator to monitor transactions. In this exemplary screen, the operator is viewing a listing of processed transactions for customer C1001. Again, transaction details are provided at 702 and an action area is provided at 704. Those skilled in the art will appreciate that other displays and actions may be presented and used to implement features of embodiments of the present invention.

Although the present invention has been described with respect to a preferred embodiment thereof, those skilled in the art will note that various substitutions may be made to those embodiments described herein without departing from the spirit and scope of the present invention.

What is claimed is:

1. A processor-implemented method for generating quality data associated with an option order, comprising:
   receiving in a data storage element and processing in a processor an option order to sell or purchase a security, said option order including information identifying a customer, and information identifying a desired option;
   associating said option order with an order time using said processor;
   identifying first national best bid and offer (NBBO) data using said processor for said desired option at said order time for said option order of the customer;
   receiving, after said option order is executed, in a data storage element and processing in a processor exchange-generated execution information associated with said executed option order, said execution information including information identifying an execution price, exchange, and execution time;
   identifying second NBBO data using said processor for said desired option at said execution time for said option order of the customer,
      wherein said second NBBO data includes data specifying a best price and an exchange having said best price;
   calculating a monetary value indicating the difference between said execution price and said second NBBO data;
   comparing said execution information associated with said executed option order with said first and second NBBO data using said processor; and
   taking remedial action relating to the option order, using said processor based comparison of said execution information with said first and second NBBO data.

2. The method of claim 1, further comprising:
   forwarding said option order to a selected one of a plurality of option exchanges to complete said option order, said forwarding based at least in part on one of said information identifying said customer and said desired option.

3. The method of claim 1, wherein said first and second NBBO data is retrieved from a substantially real-time feed of option market data.

4. The method of claim 1, wherein said information identifying a desired option further includes:
   a type of said order,
   a security underlyer,
   an option expiration date, and
   a size of said order.

5. The method of claim 1, wherein said execution information further includes exception data, said exception data identifying one or more market conditions at said exchange at said execution time.

6. The method of claim 1, further comprising comparing said execution price to said best price.

7. The method of claim 6, wherein said comparing indicates that said execution price is less favorable than said best price, the method further comprising:
   adjusting said execution to reflect said best price.

8. The method of claim 6, wherein said comparing indicates that said execution price is less favorable than said best price, the method further comprising:
   identifying an explanation of said difference between said execution price and said best price.

9. An apparatus for generating quality data associated with an option order, comprising:
   a processor; and
   a storage device in communication with said processor and storing instructions adapted to be executed by said processor to:
      receive an option order, said option order including information identifying a customer, and information identifying a desired option to sell or purchase a security;
      associate said option order with an order time;
      identify first national best bid and offer (NBBO) data for said desired option at said order time for said option order of the customer;
      receive, after said option order is executed, exchange-generated execution information associated with said executed option order, said execution information including information identifying an execution price, exchange, and execution time;

identify second NBBO data for said desired option at said execution time for said option order of the customer,
   wherein said second NBBO data includes data specifying a best price and an exchange having said best price;
calculate a monetary value indicating the difference between said execution price and said second NBBO data;
compare said execution information associated with said executed option order with said first and second NBBO data; and
take remedial action relating to the option order based on said comparison of said execution information with said first and second NBBO data.

10. The apparatus of claim 9, wherein said storage device further stores instructions adapted to be executed by said processor to forward said option order to a selected one of a plurality of option exchanges to complete said option order, said forwarding based at least in part on one of said information identifying said customer and said desired option.

11. The apparatus of claim 9, wherein said first and second NBBO data are identified based on BBO data from a plurality of option exchanges.

12. The apparatus of claim 9, wherein said first and second NBBO data is retrieved from a substantially real-time feed of option market data.

13. A processor-implemented method, comprising:
receiving in a data storage element and processing in a processor an option order to sell or purchase a security, said option order including information identifying a customer, and information identifying a desired option;
associating said option order with an order time using said processor;
identifying a plurality of exchange best bid and offer (BBO) data using said processor for said desired option at said order time;
generating using said processor, based on said plurality of BBO data, first national best bid and offer (NBBO) data for said desired option at said order time for said option order of the customer;
receiving, after execution of said option order, in a data storage element and processing in a processor exchange-generated execution information associated with said executed option order, said execution information including information identifying an execution price, exchange, and execution time;
identifying a second plurality of exchange BBO data using said processor for said desired option at said execution time;
generating using said processor, based on said plurality of BBO data, second NBBO data for said desired option at said execution time for said option order of the customer,
   wherein said second NBBO data includes data specifying a best price and an exchange having said best price;
calculating a monetary value indicating the difference between said execution price and said second NBBO data;
comparing said execution information associated with said executed option order with said first and second NBBO data using said processor; and
taking remedial action relating to the option order using said processor based on said comparison of said execution information with said first and second NBBO data.

* * * * *